United States Patent [19]

Tsukahara et al.

[11] Patent Number: 5,555,065
[45] Date of Patent: Sep. 10, 1996

[54] CAMERA DISPLAY ILLUMINATION DEVICE WHICH SWITCHABLY ILLUMINATES DISPLAYS

[75] Inventors: Daiki Tsukahara, Hiratsuka; Hiroshi Wakabayashi, Yokohama; Yuji Katano; Hidenobu Kaji, both of Kawasaki, all of Japan

[73] Assignee: Nikon Corporation, Tokyo, Japan

[21] Appl. No.: 568,395

[22] Filed: Dec. 15, 1995

Related U.S. Application Data

[63] Continuation of Ser. No. 240,155, May 10, 1994, abandoned.

[30] Foreign Application Priority Data

May 24, 1993 [JP] Japan ................................. 5-121151

[51] Int. Cl.⁶ .................................................. G03B 17/20
[52] U.S. Cl. ..................................... 354/289.12; 354/471
[58] Field of Search ............................ 354/289.1, 289.11, 354/289.12, 465, 471, 472, 473, 474, 475

[56] References Cited

U.S. PATENT DOCUMENTS

| | | | |
|---|---|---|---|
| 4,717,936 | 1/1988 | Shimizu et al. | 354/471 |
| 4,945,373 | 7/1990 | Hashimoto | 354/289.12 X |
| 4,999,665 | 3/1991 | Kuroda et al. | 354/289.1 X |
| 5,041,860 | 8/1991 | Kobayashi et al. | 354/471 X |

*Primary Examiner*—Michael L. Gellner
*Assistant Examiner*—J. K. Han

[57] ABSTRACT

A camera which switches between illuminating an external display and illuminating an internal display based on a specific photographic event, such as the pressing of the release button. The camera includes a first display, a first display illumination device which illuminates the first display, a second display, a second display illumination device which illuminates the second display, a control mechanism for controlling the first display illumination device and the second display illumination device so that the first display illumination device is not illuminating the first display when the second display illumination device is illuminating the second display and so that the second display illumination device is not illuminating the second display when the first display illumination device is illuminating the first display.

18 Claims, 4 Drawing Sheets

CAMERA DISPLAY ILLUMINATION DEVICE WHICH SWITCHABLY ILLUMINATES DISPLAYS

This application is a continuation of application Ser. No. 08/240,155, filed May 10, 1994, now abandoned.

BACKGROUND OF THE INVENTION

1. Field of the Invention

The present invention relates to a camera having external and internal displays which can be illuminated and, more particularly, to a camera which can switch between illuminating the external and internal displays.

2. Description of the Related Art

Conventional cameras exist which provide an external display on the body of the camera and an internal display inside the viewfinder. Illumination of the external display is independent of the illumination of the internal display. In these conventional cameras, the external display is typically illuminated by turning ON a display illumination switch or a display operation switch. The internal display is typically illuminated by pressing down the shutter release button halfway (that is, to a "half-push" state). This illumination of the internal display operates independently of the operation of the external display.

Since the illumination of the external display and illumination of the internal display operate independently, the external display and the internal display are often operated simultaneously. Such simultaneous illumination consumes a relatively large amount of power and, as a result, the camera battery or power supply is prematurely drained.

SUMMARY OF THE INVENTION

Accordingly, it is an object of the present invention in a camera to eliminate simultaneous illumination of the external display and internal display in order to prevent premature draining of the camera battery.

It is an object of the present invention in a camera to switch between illuminating the external display and illuminating the internal display so that the illumination of the internal display is turned OFF when a photographer is viewing the external display and the illumination of the external display is turned OFF when the photographer is viewing the internal display.

It is also an object of the present invention in a camera to link the switching of the display illumination to the start of picture-taking operations.

It is a further object of the present invention in a camera to switch between illuminating the internal display and illuminating the external display without requiring special switching buttons which would increase camera cost and require space on the camera body.

It is a further object of the present invention in a camera to switch between illuminating the internal display and illuminating the external display based on the operation of the release button or zoom lens operation buttons.

It is a still further object of the present invention in a camera to switch between illuminating the internal display and illuminating the external display based on the start of picture-taking operations, thereby providing increased operability without the need for special switching buttons.

Additional objects and advantages of the invention will be set forth in part in the description which follows and, in part, will be obvious from the description, or may be learned by practice of the invention.

The foregoing objects of the present invention are achieved by providing a camera comprising a first display, a first display illumination device which illuminates the first display, a second display, a second display illumination device which illuminates the second display and a control mechanism for controlling the first display illumination device and the second display illumination device so that the first display illumination device is not illuminating the first display when the second display illumination device is illuminating the second display and so that the second display illumination device is not illuminating the second display when the first display illumination device is illuminating the first display.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
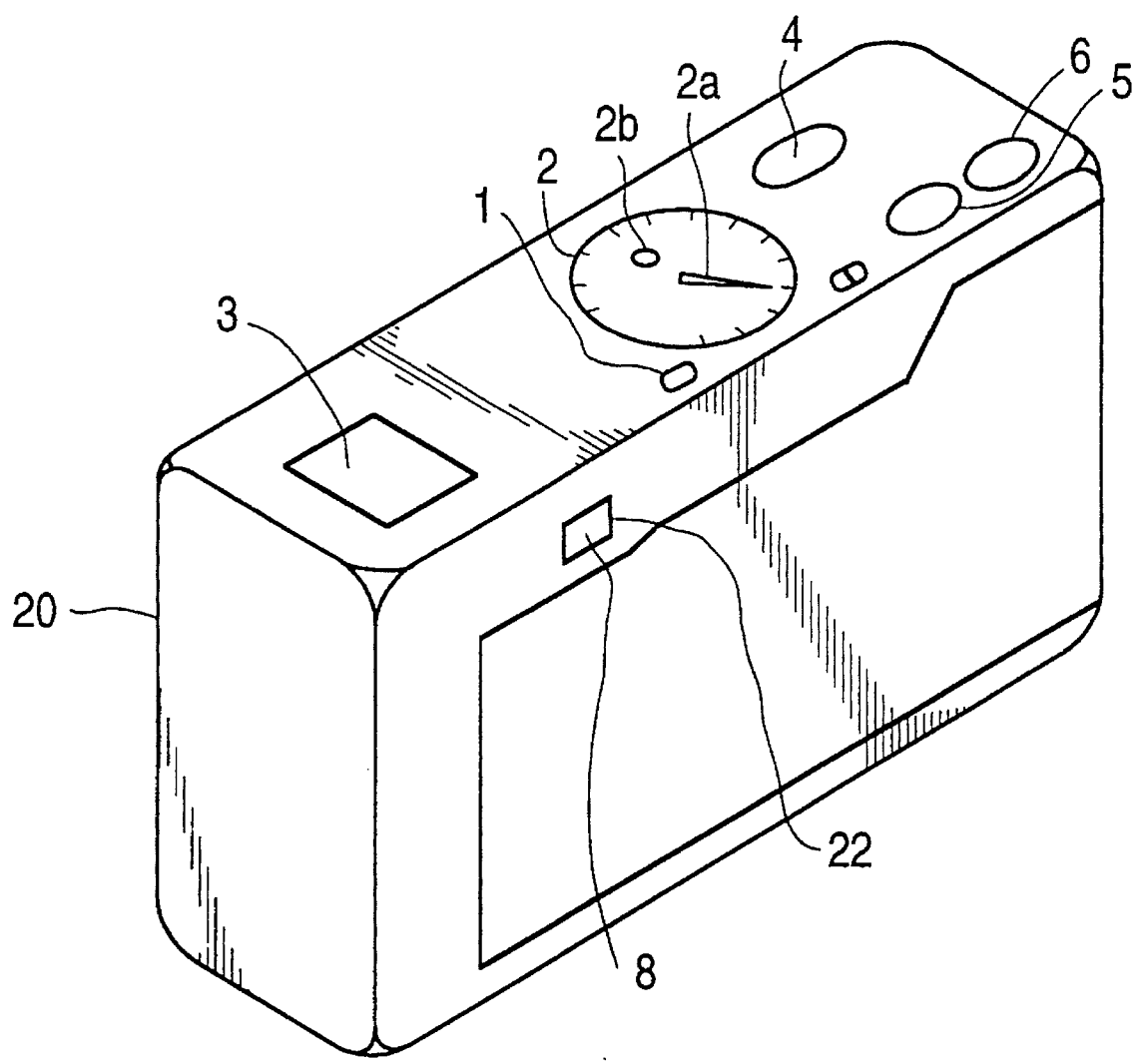
FIG. 1 is an external view of a camera according to an embodiment of the present invention.

Reference will now be made in detail to the present preferred embodiments of the present invention, examples of which are illustrated in the accompanying drawings, wherein like reference numerals refer to like elements throughout.

FIG. 1 is an external view of a camera according to an embodiment of the present invention. Camera 20 includes illumination start button 1 and external display 2. External display 2 includes a display indicator 2a and an external illumination lamp 2b for illuminating external display 2. External illumination lamp 2b is typically an LED. When illumination start button 1 is pressed, external illumination lamp 2b is turned ON for a specified period of time.

Lighting window 3 guides ambient light toward the interior of viewfinder 22. Internal display 8 resides inside viewfinder 22.

Release button 4 operates a shutter (not illustrated) and has a first position and a second position. The first position preferably represents a half-push state of release button 4 (that is, when release button 4 is pressed halfway down) and the second position represents a full-push state of release button 4 (that is, when release button 4 is fully pressed). The second position follows the first position in the respect that release button 4 must first reach the first position before reaching the second position. Photographic operations begin when release button 4 is in the first position (half-push state). Such photographic operations include the initiation of photometric device 13 (see FIG. 2) and range-finding device 12

Figure 2:
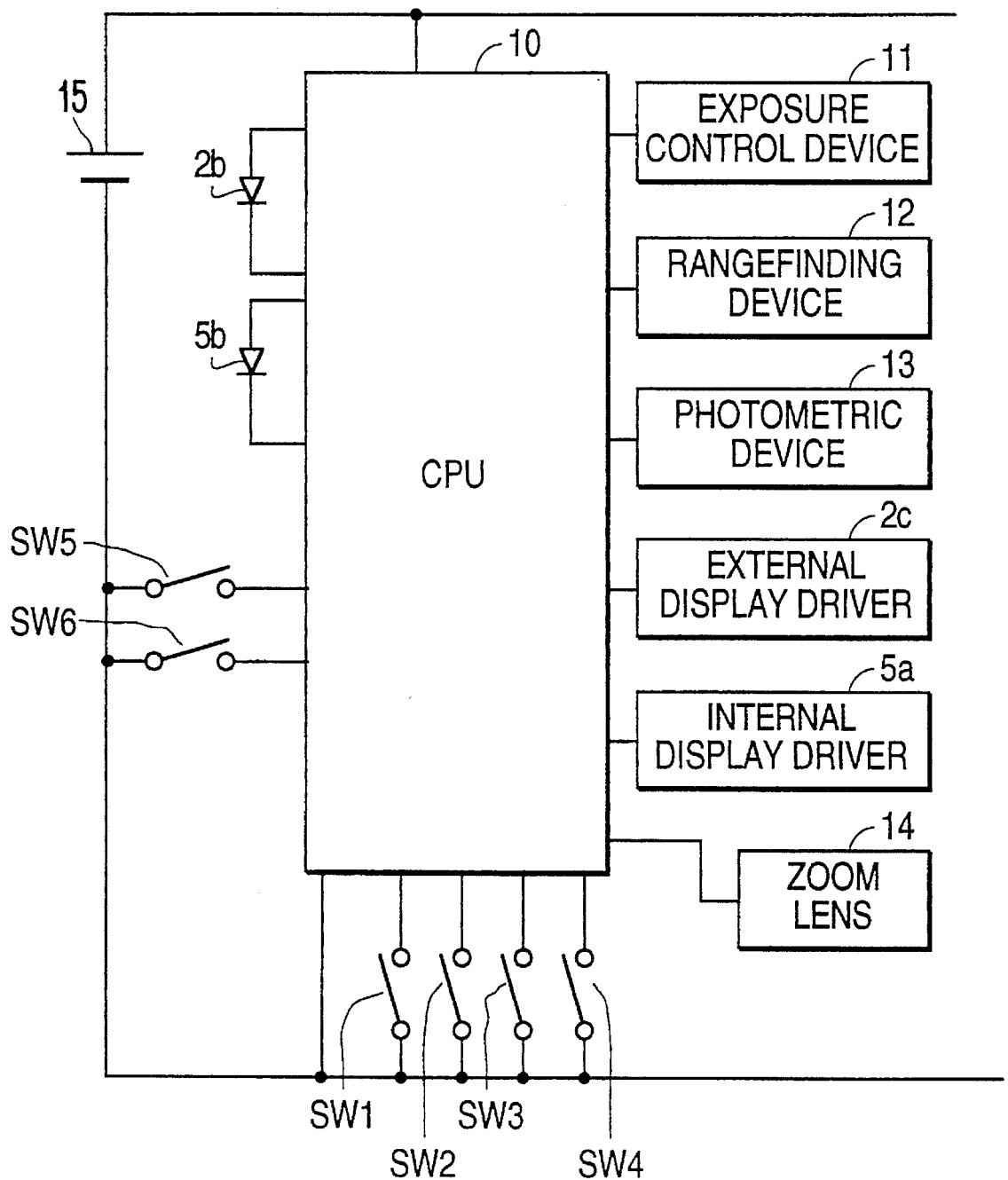
FIG. 2 is a block diagram for explaining the structure and operations of a camera according to an embodiment of the present invention.

(see FIG. 2). Shutter release is performed when release button 4 is in the second position (full-push state).

Camera 20 also includes a zoom lens 14 (see FIG. 2). A photographer presses zoom-down button 5 to retract zoom lens 14 and presses zoom-up button 6 to extend zoom lens 14.

FIG. 2 is a block diagram for explaining the structure and operations of the camera according to an embodiment of the present invention. CPU 10 controls camera operation and is electrically interfaced to main switch SW1, illumination start switch SW2, first position switch SW3, second position switch SW4, zoom-down switch SW5 and zoom-up switch SW6. Main switch SW1 turns ON when a main power button (not illustrated) is pressed. When main switch SW1 turns ON, the operations of CPU 10 begin. Illumination start switch SW2 turns ON when illumination start button 1 is pressed. When illumination start switch SW2 turns ON, external illumination lamp 2b is lit by CPU 10. First position switch SW3 turns ON when release button 4 is in the first position. Second position switch SW4 turns ON when release button 4 is in the second position.

Exposure control device 11, range-finding device 12, photometric device 13, external display driver 2c, internal display driver 5a, external illumination lamp 2b and internal illumination lamp 5b (preferably an LED) are also interfaced to CPU 10.

Battery 15 provides power to components for the camera in FIG. 2.

CPU 10 causes range-finding device 12 and photometric device 13 to operate when release button 4 is in the first position, that is, when first position switch SW3 turns ON. CPU 10 causes exposure control device 11 to operate when release button 4 is in the second position, that is, when second position switch SW4 is turns ON.

Internal display driver 5a drives internal illumination lamp 5b inside viewfinder 22. External display driver 2c drives external illumination lamp 2b. Zoom lens 14 is also interfaced to CPU 10. Zoom-down switch SW5 turns ON when zoom-down button 5 is operated. Zoom-up switch SW6 turns ON when zoom-up button 6 is operated.

Exposure control devices, range-finding devices, photometric devices, external display drivers and internal display drivers are all well-known in the art.

Figure 3:
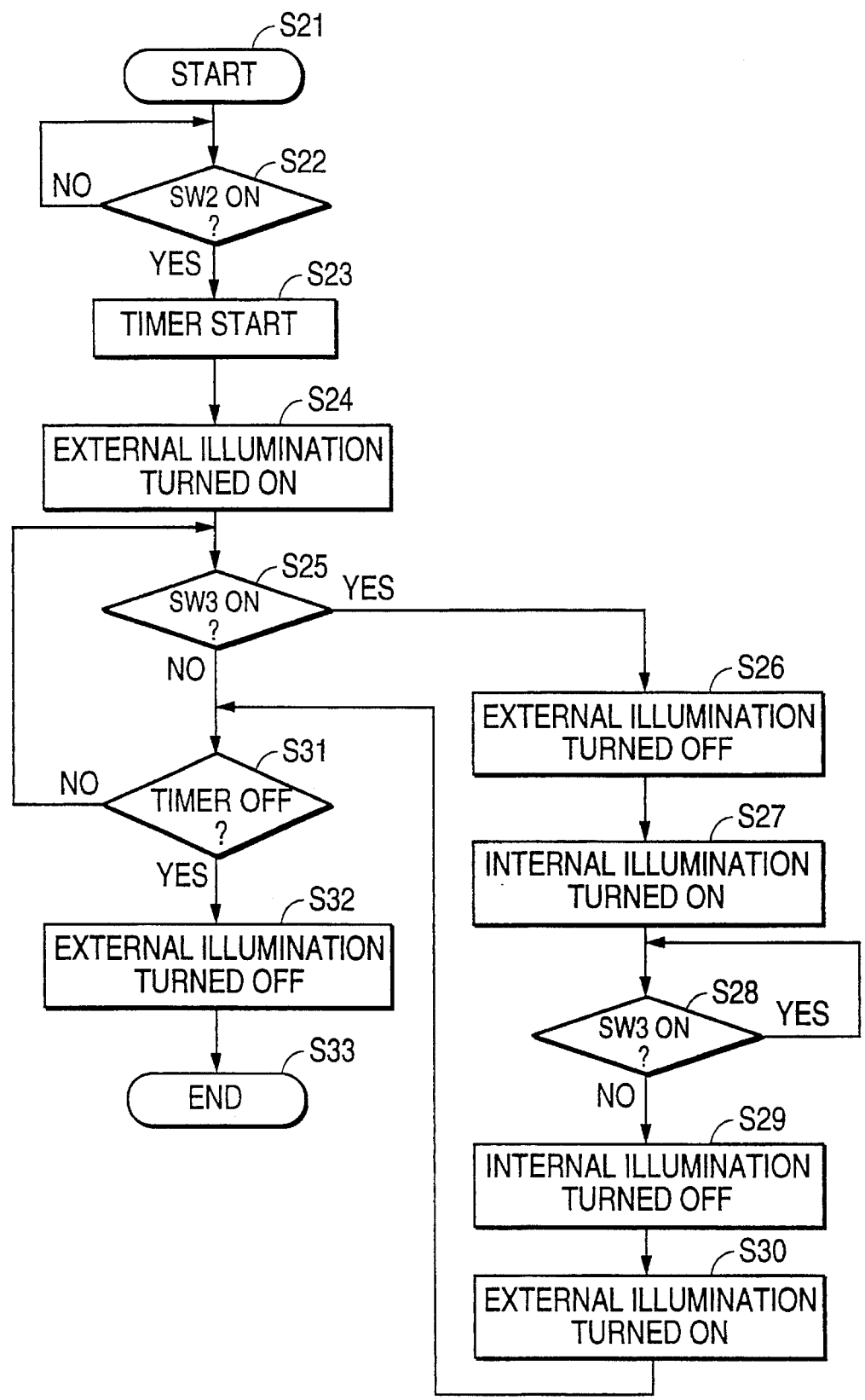
FIG. 3 is a flow chart of a processing sequence for switching the display illumination for a camera according to an embodiment of the present invention.

FIG. 3 is a flow chart of a processing sequence for switching the display illumination for a camera according to an embodiment of the present invention. As can be seen from FIG. 3, the system switchably illuminates either external display 3 or internal display 8 depending on the status of release button 4. The process starts in step S21. In step S22, a determination is made as to whether illumination start switch SW2 is ON. When SW2 is OFF, the process waits at step S22. When illumination start switch SW2 is ON, the system proceeds to step S23 and a display timer (not illustrated) starts. Next, in step S24, external illumination lamp 2b is turned ON. In step S25, it is determined whether first position switch SW3 is ON (thereby indicating that release button 4 is in the first position). When switch SW3 is ON in step S25, the system proceeds to step S26 where external illumination lamp 2b is turned OFF. Next, in step S27, internal illumination lamp 5b is turned ON. In step S28, the process waits for SW3 to turn OFF (thereby indicating that release button 4 is no longer in the first position) and, when switch SW3 is turned OFF, the process moves to step S29 where internal illumination lamp 5b is turned OFF. Then, in step S30, external illumination lamp 2b is turned ON. From step S30, the process moves to step S31. When switch SW3 is OFF in step S25, the process moves to step S31.

In step S31, it is determined whether the specified time on the timer initiated in step S23 has elapsed. If the time has not elapsed, the process returns to step S25. If the time has elapsed, the process moves to step S32 where external illumination lamp 2b is turned OFF. After step S32, the process ends in step S33.

Camera 20 can also be configured so that different types of mechanisms, instead of release button 4, are used to switch illumination between external display 2 and internal display 8.

Figure 4:
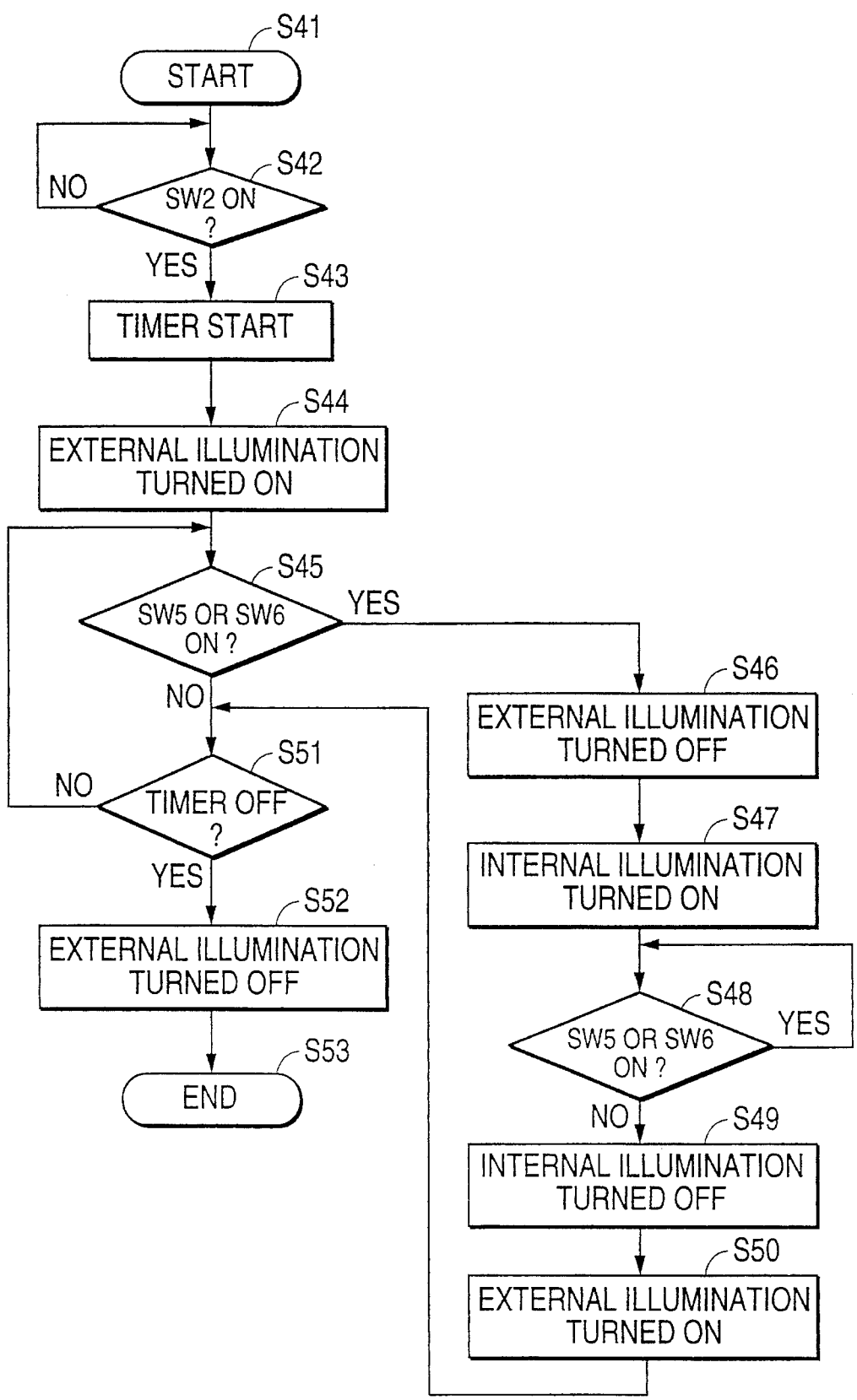
FIG. 4 is a flow chart of an additional processing sequence for switching the display illumination for a camera according to an embodiment of the present invention.

For example, FIG. 4 is a flow chart of an additional processing sequence for switching the display illumination for a camera according to an embodiment of the present invention, wherein camera 20 switchably illuminates either external display 2 or internal display 8 depending on the status of zoom lens 14. Internal display 8 is illuminated when zoom lens 14 is either extended or retracted based on the status of zoom-up switch SW6 and zoom-down switch SW5, respectively, and external display 2 is illuminated when zoom lens 14 is not extended or retracted. Linking the display illumination to operation of zoom lens 14 is useful since operation of zoom lens 14 can signify that the photographer is in a picture taking mode and is probably looking through viewfinder 22.

Referring now to FIG. 4, the process starts in step S41. In step S42, a determination is made as to whether illumination start switch SW2 is ON. If illumination start switch SW2 is OFF, the process waits at step S42. When illumination start switch SW2 is ON, the system proceeds to step S43 and a display timer (not illustrated) starts. Next, in step S44, external illumination lamp 2b is turned ON. In step S45, it is determined whether zoom-down switch SW5 or zoom-up switch SW6 is ON (thereby indicating that zoom lens 14 is either retracted or extended, respectively). When either zoom-down switch SW5 or zoom-up switch SW6 is ON in step S45, the system proceeds to step S46 where external illumination lamp 2b is turned OFF. Next, in step S47, internal illumination lamp 5b is turned ON. In step S48, the process waits for both zoom-down switch SW5 and zoom-up switch SW6 to be OFF (thereby indicating that zoom lens 14 is not extended or retracted) and, when both zoom-down switch SW5 and zoom-up switch SW6 are OFF, the process moves to step S49 where internal illumination lamp 5b is turned OFF. Then, in step S50, external illumination lamp 2b is turned ON. From step S50, the process moves to step S51.

When both zoom-down switch SW5 and zoom-up switch SW6 are OFF in step S45, the process moves to step S51.

In step S51, it is determined whether the specified time on the timer initiated in step S43 has elapsed. If the time has not elapsed, the process returns to step S45. If the time has elapsed, the process moves to step S52 where external illumination lamp 2b is turned OFF. After step S52, the process ends in step S53.

Camera 20 could also utilize other mechanisms for switching illumination between the internal display 8 and the external display 2. For example, camera 20 may be configured so that a touch sensor is positioned near release button 4 and switching between illuminating internal display 8 and external display 2 is performed by a finger of the photographer touching this touch sensor.

Preferably, camera 20 utilizes a "photographic event indicating unit" to switch between illuminating external display 2 and internal display 8 based on the occurrence of a photographic event. Such a photographic event should preferably represent the start of photographic operations. For example, as in the flow chart of FIG. 3, the photographic event could be the pressing of release button 4 since such pressing is a significant photographic event which indicates that a photographer is preparing to take a photograph. In this case, the "photographic event indicating unit" would be the release button. Similarly, as in the flow chart of FIG. 4, the photographic event could be the operation of zoom lens 14 since such operation is a significant photographic event which indicates that the photographer is preparing to take a photograph. With display illumination linked to operation of zoom lens 14, the "photographic event indicating unit" would comprise both zoom-down button 5 and zoom-up button 6.

Switching the illumination of external display 2 and internal display 8 can be linked to virtually any photographic event with many different switches, buttons, or devices acting as a "photographic event indicating unit."

As an additional example of a "photographic event indicating unit," a photoelectric sensor could also be used to switch between illumination of external display 2 and internal display 8. The photoelectric sensor should be positioned on camera 20 so as to detect when a photographer is peering into viewfinder 22. Internal display 8 could then be illuminated when the photoelectric sensor senses the photographer peering into viewfinder 22 and external display 2 could be illuminated when the photoelectric sensor does not detect the photographer peering into viewfinder 22. The photographic event is the peering through viewfinder 22 by a photographer.

In the present embodiments of the present invention, initiating illumination of external display 2 is performed by operating illumination start button 1. However, it is also possible to link the illumination of external display 2 to the main power button so that, when power switch SW1 is ON (indicating that the main power button is ON), camera 20 senses the ambient illumination and automatically illuminates external display 2 when the ambient illumination is at a low level.

Although a few preferred embodiment of the present invention have been shown and described, it would be appreciated by those skilled in the art that changes may be made in these embodiments without departing from the principles and spirit of the invention, the scope of which is defined in the claims and their equivalents.

What is claimed is:

1. A display apparatus comprising:

a viewfinder;

a first display device;

a first display illumination device which illuminates the first display device;

a second display device positioned inside the viewfinder, the first display device not being positioned inside the viewfinder;

a second display illumination device which illuminates the second display device; and a control mechanism for controlling the first display illumination device and the second display illumination device so that the first display illumination device is not illuminating the first display device when the second display illumination device is illuminating the second display device and so that the second display illumination device is not illuminating the second display device when the first display illumination device is illuminating the first display device.

2. A display apparatus as in claim 1, the display apparatus being a part of a camera and further comprising a photographic event indicating unit which outputs a signal in response to the occurrence of a photographic event, wherein, when the first display illumination device is illuminating the first display device and the photographic event indicating unit outputs a signal in response to the occurrence of the photographic event, the control mechanism stops the first display illumination device from illuminating the first display device and causes the second display illumination device to illuminate the second display device.

3. A display apparatus as in claim 2, wherein the photographic event indicating unit comprises a release button and the photographic event is the pressing of the release button.

4. A display apparatus as in claim 2, further comprising a zoom lens, wherein the photographic event indicating unit comprises a zoom control mechanism which allows a photographer to control the zoom lens by operating the zoom control mechanism and the photographic event is the operation of the zoom control mechanism.

5. A display apparatus comprising:

a viewfinder;

a first display device;

a first display illumination device which has a first mode and a second mode that cause the first display device to be illuminated and not illuminated, respectively;

a second display device positioned inside the viewfinder, the first display device not being positioned inside the viewfinder;

a second display illumination device which has a first mode and a second mode that cause the second display device to be illuminated and not illuminated, respectively;

a photographic event indicating unit which outputs a signal in response to the occurrence of a photographic event; and a control mechanism for controlling the first display illumination device and the second display illumination device so that, when the first display illumination device is in the first mode and the photographic event indicating unit outputs a signal in response to the occurrence of the photographic event, the first display illumination device is switched to the second mode and the second display illumination device is switched to the first mode, thereby causing the first display device to be not illuminated and the second display device to be illuminated.

6. A display apparatus as in claim 5, the display device being a part of a camera, wherein the photographic event indicating unit comprises a release button and the photographic event is the pressing of the release button.

7. A display apparatus as in claim 5, the display device being a part of a camera and further comprising a zoom lens, wherein the photographic event indicating unit comprises a zoom control mechanism which allows a photographer to operate the zoom control mechanism in order to control the zoom lens and the photographic event is the operation of the zoom control mechanism.

8. A display apparatus as in claim 5, further comprising an initiation device which puts the first display illumination device in the first mode, thereby illuminating the first display device, wherein, when the first display illumination device is put in the first mode by the initiation device and the photographic event indicating unit outputs a signal in response to the occurrence of a photographic event, the control mechanism causes the first display illumination device to be in the second mode and causes the second display illumination device to be in the first mode, thereby causing the second display device to be illuminated and the first display device to not be illuminated.

9. A display apparatus as in claim 8, wherein the photographic event indicating unit comprises a release button and the photographic event is the pressing of the release button.

10. A display apparatus as in claim 8, further comprising a zoom lens, wherein the photographic event indicating unit comprises a zoom control mechanism which allows a photographer to operate the zoom control mechanism in order to control the zoom lens and the photographic event is the operation of the zoom control mechanism.

11. A camera comprising:

a first display device;

a first display illumination device which illuminates the first display device;

a second display device arranged at a different position than the first display device;

a second display illumination device which illuminates the second display device;

a release button; and a control mechanism for controlling the first display illumination device and the second display illumination device so that the first display illumination device is not illuminating the first display device when the second display illumination device is illuminating the second display device and so that the second display illumination device is not illuminating the second display device when the first display illumination device is illuminating the first display device, wherein when the first display illumination device is illuminating the first display device and the release button is pressed, the control mechanism stops the first display illumination device from illuminating the first display device and causes the second display illumination device to illuminate the second display device.

12. A camera as in claim 11, further comprising a viewfinder, wherein the second display device is positioned inside the viewfinder, and the first display device is not positioned inside the viewfinder.

13. A camera comprising:

a first display device;

a first display illumination device which illuminates the first display device;

a second display device arranged at a different position than the first display device;

a second display illumination device which illuminates the second display device;

a zoom control mechanism which is operable to control a zoom lens; and a control mechanism for controlling the first display illumination device and the second display illumination device so that the first display illumination device is not illuminating the first display device when the second display illumination device is illuminating the second display device and so that the second display illumination device is not illuminating the second display device when the first display illumination device is illuminating the first display device, wherein when the first display illumination device is illuminating the first display device and the zoom control mechanism and operated, the control mechanism stops the first display illumination device from illuminating the first display device and causes the second display illumination device to illuminate the second display device.

14. A camera comprising:

a first display device;

a first display illumination device which has a first mode and a second mode that cause the first display device to be illuminated and not illuminated, respectively;

a second display device arranged at a different position than the first display device;

a second display illumination device which has a first mode and a second mode that cause the second display device to be illuminated and not illuminated, respectively;

a release button; and a control mechanism for controlling the first display illumination device and the second display illumination device so that, when the first display illumination device is in the first mode and the release button is pressed, the first display illumination device is switched to the second mode and the second display illumination device is switched to the first mode, thereby causing the first display device to be not illuminated and the second display device to be illuminated.

15. A camera as in claim 14, further comprising a viewfinder, wherein the second display device is positioned inside the viewfinder and the first display device is not positioned inside the viewfinder.

16. A camera as in claim 14, further comprising an initiation device which puts the first display illumination device in the first mode, thereby illuminating the first display device, wherein, when the first display illumination device is put in the first mode by the initiation device and the release button is pressed, the control mechanism causes the first display illumination device to be in the second mode and causes the second display illumination device to be in the first mode, thereby causing the second display device to be illuminated and the first display device to not be illuminated.

17. A camera as in claim 16, further comprising a viewfinder, wherein the second display device is positioned inside the viewfinder, and the first display device is not positioned inside the viewfinder.

18. A camera comprising:

a first display device;

a first display illumination device which has a first mode and a second mode that cause the first display device to be illuminated and not illuminated, respectively;

a second display device arranged at a different position than the first display device;

a second display illumination device which has a first mode and a second mode that cause the second display device to be illuminated and not illuminated, respectively;

a zoom control mechanism which is operable to control a zoom lens; and a control mechanism for controlling the first display illumination device and the second display illumination device so that, when the first display illumination device is in the first mode and the zoom control mechanism is operated, the first display illumination device is switched to the second mode and the second display illumination device is switched to the first mode, thereby causing the first display device to be not illuminated and the second display device to be illuminated.

* * * * *